Jan. 6, 1931.   L. P. HYNES   1,788,107
ELECTRIC HEATING SYSTEM
Filed March 11, 1922   3 Sheets-Sheet 1
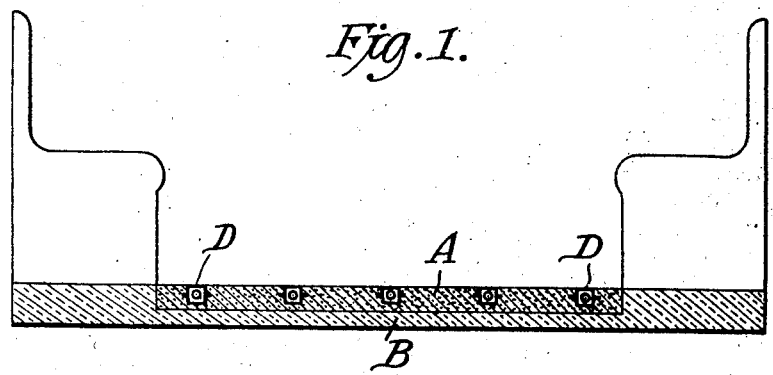
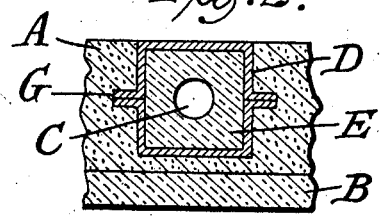
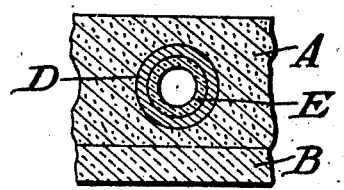
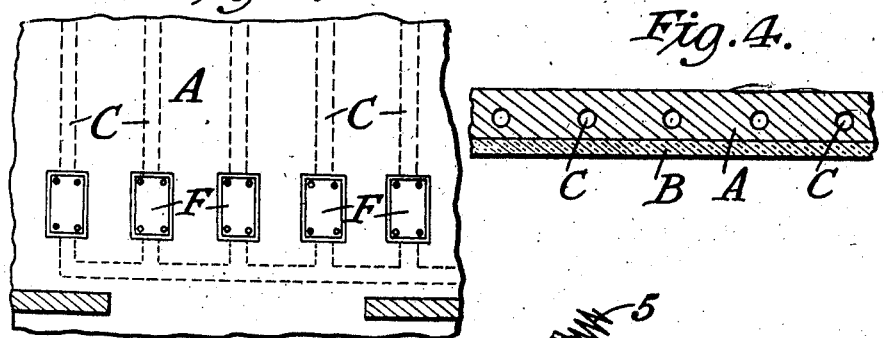
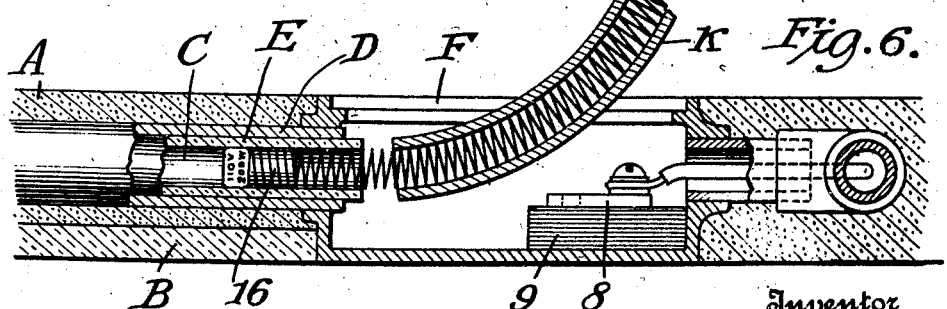
Inventor
Leo P. Hynes
By his Attorney
E. M. Bentley

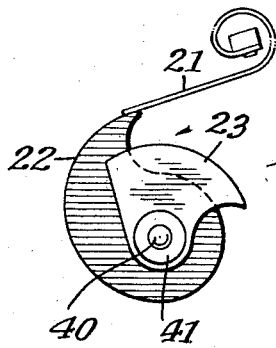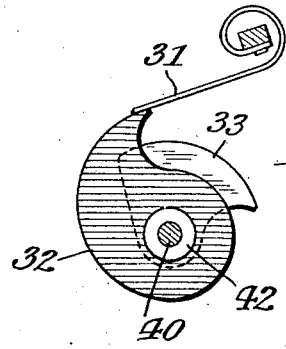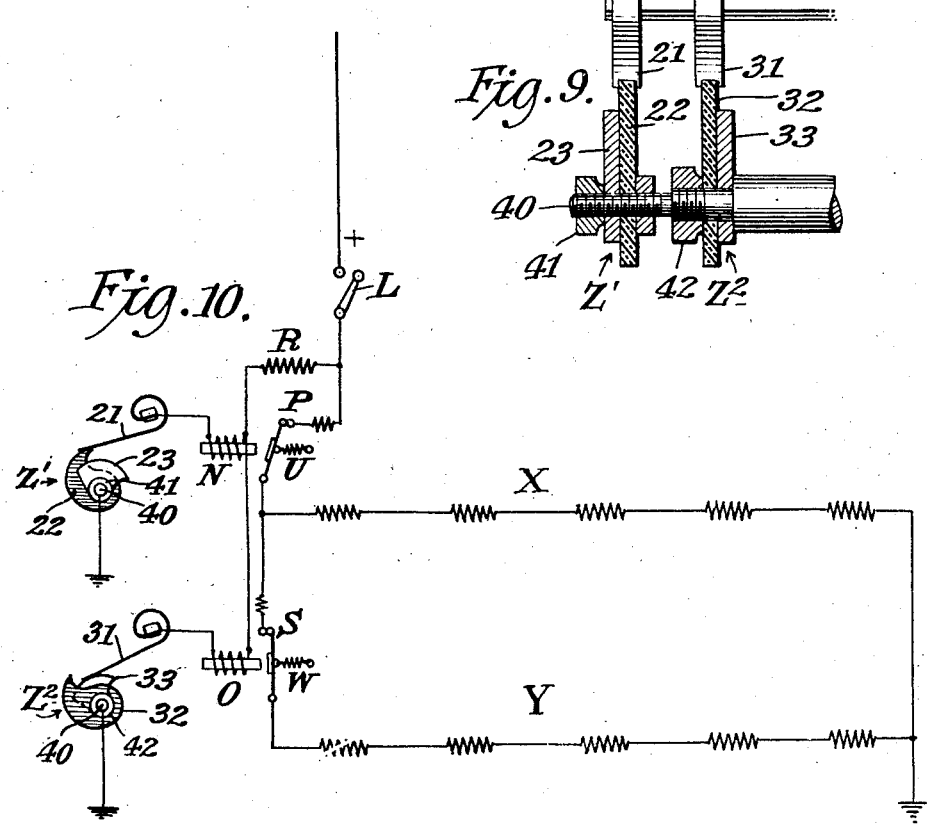

Jan. 6, 1931.  L. P. HYNES  1,788,107
ELECTRIC HEATING SYSTEM
Filed March 11, 1922   3 Sheets-Sheet 3

Inventor
Lee P. Hynes
By his Attorney
E. M. Bentley

Patented Jan. 6, 1931

1,788,107

UNITED STATES PATENT OFFICE

LEE P. HYNES, OF ALBANY, NEW YORK, ASSIGNOR, BY MESNE ASSIGNMENTS, TO CONSOLIDATED CAR-HEATING COMPANY, INC., OF ALBANY, NEW YORK, A CORPORATION OF NEW YORK

ELECTRIC HEATING SYSTEM

Application filed March 11, 1922. Serial No. 543,078.

For a detailed description of the present form of my invention, reference may be had to the following specification and to the accompanying drawings forming a part thereof, wherein Fig. 1 is a cross-section of a car floor showing my heaters therein;

Fig. 2 shows the heater of Fig. 1 on an enlarged scale;

Figs. 3 and 4 are modifications;

Fig. 5 is a plan of the floor at the end of a car containing my heaters;

Fig. 6 illustrates the mode of introducing the heater coils;

Figs. 7, 8 and 9 show the contacts for my automatic peak-controller;

Fig. 10 is a diagram of the circuits;

Figure 11:
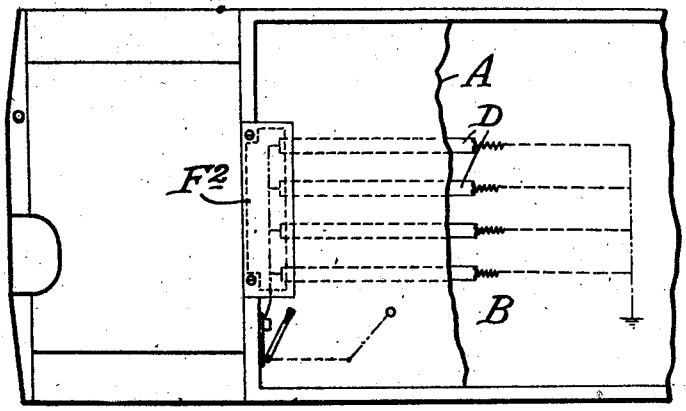
Figure 11 is a plan view with parts broken away and Figure 12 is a longitudinal sectional view illustrating a slight modification of the invention.

My invention relates to a system of electric heating wherein a railway car or other apartment may be heated from a previously accumulated store of heat during the hours of peak load on the supply system.

It is well known that the demands on an ordinary railway or lighting circuit for current-service is not of a uniform magnitude at all hours of the day. During an hour or two at morning and evening the demand is very great, rising to a maximum or "peak" value, but during the rest of the day is much less. It is also a fact that the price for current is also greater per watt during the "peak" hours. Hence it is of much importance to a railway which heats its cars electrically if the heater load can be eliminated during those hours.

To provide for this I have devised an electric heater of a kind which will not only heat the cars in normal fashion during most of the day, but which will, by a mere excess of heating current for a period just before the peak or rush hour arrives, store up heat sufficient to carry over the peak hour with all heating current cut off. An electric heater is in its nature a converter of energy, generating a definite amount of heat every second. During most of the day the heater can not be permitted to generate more heat than will be dissipated by the cooling influences. I therefore provide that only for a certain brief period, just prior to the peak hour, will the heater produce more heat than is being dissipated and the excess thus produced I store up for use during the peak hour. In order that this operation may take place automatically, I employ a clock or clock-controlled motor which will throw on extra current for a suitable period prior to the peak hour, this extra heat being additional to the normal amount which is maintained during the day, then when the peak hour arrives it will throw off all heating current, and at the end of the peak hour will throw on the normal heating current.

As a storage medium, I prefer to make use of the cement or concrete floor of the car which contains sufficient volume of material to act as a reservoir of heat, and yet has an area which prevents too high a temperature locally by concentrating too much heat at local points. It also serves to distribute the stored heat when the heating current is cut off. Moreover, its location and relation to the car is such that during the non-rush hours it will heat the car more uniformly and comfortably for the passengers, with much less current and lower heater temperature than does the present mode of car heating. Finally it adds nothing to the present weight of the car, which is a highly important feature. In some cases, particularly in dwellings or offices, the walls of the apartment might serve this purpose, but I prefer to use the floor. The type of heater heretofore used requires operation at a comparatively high temperature which is not only uncomfortable at points close to them but dangerous to passengers' clothing and even to the car itself. They are unsanitary, since they form receptacles for the collection of dust, dirt and germ-laden refuse, and, having exposed coils, they must be guarded, screened from contact with metal articles that might short-circuit them. Such screens tend to clog the circulation of air, and build up the operating temperature of the coils and casing, while the breaking of one of the exposed coils occasions fright and commotion of the passengers, and at times causes serious damage to the car.

Thus by making use of closed-in heating coils embedded in the car floor, I not only can provide heat storage to carry over the peak hour, but can also secure much better, safer, cleaner, more sanitary and more economical heating during normal hours. My present system is particularly designed for car heating, but may be utilized in other situations where the conditions are similar enough to make its use practicable and desirable. Moreover, during excessively cold weather, or other warranting conditions, a portion of the normal heating agency may be left on during the peak-hour.

Referring to the drawings, A represents a layer of cement, concrete or other suitable material constituting the floor of the car, and B is an underlying layer of asbestos or other heat-insulating material. Through the floor-layer I extend a series of metal tubes which may be square and flush with the surface, as in Figs. 1 and 2, or round and below the surface as in Fig. 3. I may even omit the metal tubes and form the ducts C in the layer A, as in Fig. 4, provided the material of the layer is of an adequate refractory and insulating character and free from cracks. I prefer, however, to employ the metal tube for mechanical protection and to insure the insulation, particularly with high voltages, while in the flush form of Figs. 1 and 2, a portion of the heat will be delivered from the metal directly into the car. The metal tube may, if desired, be made in two parts welded or riveted together with ribs G at the joint as appears in Figs. 1 and 2. Such ribs interlock with the cement of layer A and aid in stiffening and strengthening effect which the tubes add to the floor. Such stiffening and strengthening effect will, however, be present if the ribs G are omitted and the metal tube is devoid of longitudinal joints as it is in Fig. 3. Together with the metal tube I provide an interior lining E therefor of porcelain, glass or other suitable material made in tubular sections abutting end to end and conforming in outer contour to the inner contour of the metal pipe. The duct C is thus enclosed by a wall of refractory insulation. In the absence of the metal tubes, the ducts C are produced by molding the cement around cylindrical formers which are subsequently withdrawn, or in any other suitable way.

The ducts terminate preferably in individual junction boxes F, although a single, wide junction box may be provided extending across the series of ducts into which all of the ducts open. In any event the junction box is of such dimensions that a flexible heating coil 5 may be inserted through it into the duct as shown in Fig. 6. In that figure the heating coil 5 is shown as provided with a permanently attached terminal 16 in the form of a short cylinder with a flat spot whereon characters identifying the coil are stamped. The surface of the cylinder has a helical groove in which several turns of the helical heater coil are placed and the metal of the cylinder swaged down thereon. Such a coil is disclosed and claimed in another pending application for patent, and is not claimed herein. A coil of this description is designed to be placed in or removed from a heater duct, the terminal 16 and the coil 5 both being of such diameter that it may travel through the duct, and, being flexible, will adapt itself to irregularities therein, even passing around pronounced curves. In Fig. 6 the coil is shown as being directed into the duct by a curved guide K, preferably as it is unwound from a large fisherman's reel. It may either be pushed or pulled into the duct, but since, in its relaxed condition, it is shorter than the duct in which it is to remain it is better to draw it into the duct from the farther end by means of a steel wire or tape which has first been threaded through the duct and temporarily attached to the terminal 16. Then the rear end of the coil being secured, it could be elongated by pulling until its terminal reaches the farther end. The terminals are connected respectively to binding-plates 8 seated on an insulating block 9 in junction-box F. The coil is thus held under tension while in use.

Referring to Fig. 10, X and Y are two groups of heater coils which are so controlled by time-switches as to give the following three conditions:—(1) Normal condition, in which coils X are alone in circuit, coils Y being disconnected. (2) Heat storage condition, in which coils X and Y are both in circuit. (3) Peak-hour condition, in which both X and Y are disconnected. This cycle will ordinarily be repeated twice a day for the morning and evening peak hours, the second condition starting—say half an hour before the third and ending when the third starts, while at the end of the peak hour the first or normal condition is re-established. In Fig. 10, L is a hand-switch in a line leading from the trolley. P is the switch for coil-group X and is held normally closed by a spring U. S is the switch for coil-group Y and is normally opened by a spring W. N is a magnet controlling the switch P, and O a similar magnet controlling switch W. $Z^1$ is a time-switch for magnet N and $Z^2$ is a similar time-switch for magnet O. Both switches may be mounted, as shown in Fig. 9, on a clock-controlled shaft 40 and properly spaced with respect to each other by the thumb-nuts 41 and 42, which secure them to the shaft in any desired angular relation. The switch $Z^1$, as shown in Fig. 7, consists of an insulating cam 22 and a metal cam 23 grounded through shaft 40. A contact spring 21 bears on the two cams in succession and snaps from one to the other as it leaves the tip of the cam. Time-switch Z² is similarly constructed as shown in Fig. 8, with an insulating cam 32 and a metal cam 33 grounded on shaft 40, and also a contact spring 31 corresponding to contact spring 21 of time-switch Z¹, the latter being in circuit with magnet N and the former in circuit with magnet O, while both magnets are connected to trolley through a resistance R. Assuming the two switches to be properly timed and related, the springs 21 and 31 will bear on their insulating discs 22 and 32 during most of the day, the magnets N and O being both de-energized, the switch P remaining closed to keep normal current on coil-group X and switch S remaining open to keep coil-group Y out of circuit. At the predetermined time prior to the peak-hour, switch Z² will act, the spring 31 snapping down on metal cam 33 and closing a circuit from trolley through magnet O to spring 31 to cam 33 and ground. That will energize magnet O and close switch S putting coil-group Y in circuit in addition to coil-group X. Then as the peak-hour arrives switch Z¹ will act, allowing its spring 21 to drop on metal cam 23 closing the circuit of magnet N. That will open switch P and cut off current from both coil-groups, switch Z² acting again about the same time to open the circuit of magnet O. At the end of the peak-hour, switch Z¹ will act again, its spring 21 dropping from metal cam 23 back on insulating cam 22. That will de-energize magnet N, allow switch P to close and thereby restore the normal heating condition. The coil groups can be adjusted in magnitude or number by the usual control switches to meet varying conditions of weather and season.

Figure 12:
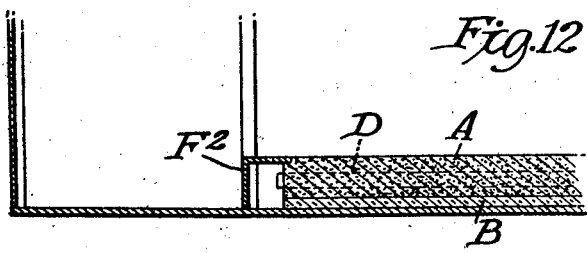

In Figs. 11 and 12 the heating tubes are extended clear to the end of the floor in a car having a step from the car-floor down to the car-platform. This step I form as a junction-box, making it angular in shape to cover and enclose a space at the floor end, and also making it removable. By this means it becomes much easier to insert the coils into the ducts.

Figure 13:
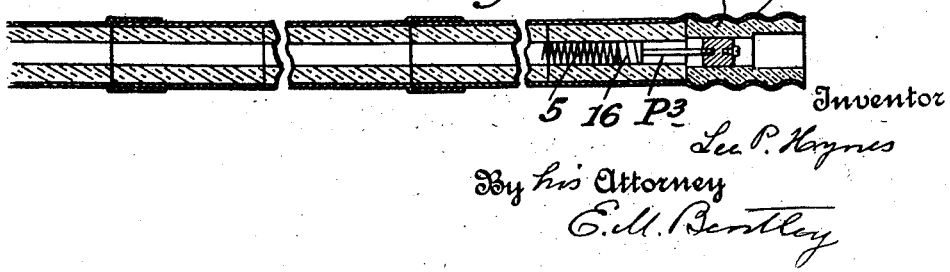
Figure 13 is a longitudinal sectional view of a modified form of the invention.

In Fig. 13 the metal tube is formed in sections with a close-fitting bell mouth on one section receiving the end of an adjacent section, while the terminal section is formed with a screw-threaded socket wherein is an insulating bushing P¹ containing a metal terminal block which is connected to coil 5 by a heat resisting rod P³ leading to the coil-end 16. It is to be understood that I do not intend to limit my claims to the specific devices herein shown, since the principles of my invention may be embodied in various other forms; also the system entitled in the following claims as a car-heating system will remain the same in substance if transfered to some other apartment to be heated and will be equally included by the claims when so transferred. It is also not necessary that the metal tubes be rigid or follow straight lines for flexible tubes, or rigid tubes suitably bent to avoid obstructions may be used and the flexibility of the coil will permit its passing around the curves in the ducts.

It is to be understood that although the invention has been illustrated and described as applied to a flooring, it is not limited thereto, but is equally applicable to a wall or partition or any other similar structure within the terms of the appended claims.

What I claim as new and desire to secure by Letters Patent is:

1. An electric heating system comprising a mass of insulating, heat-storing material having embedded therein a flanged metal tube, an insulating lining in said tube, and a separable heating coil inserted in said lining.

2. An electric heating system comprising a floor provided with embedded flanged metal tubes, an insulating lining in said tubes and separable heating coils within said lining.

3. An electric heating system comprising a heat storing medium having a heat radiating surface, means providing an electric circuit, heat producing means enclosed within said heat storing medium, control means normally connecting a portion of said heating means with said electric circuit, circuit control means normally disconnecting the rest of said heating means from said circuit, means for operating the second circuit control means to connect the last mentioned portion of the heating means with the circuit, so that the heat storing means may absorb the excess heat, control means operated in sequence with the first mentioned control means for breaking the circuit to all portions of said heating means, said last mentioned control means including means for automatically returning the parts to their original relation.

4. An electric heating system comprising a heat storing medium having a heat radiating surface, means providing an electric circuit, heat producing means within the heat storing medium, circuit control means normally connecting a portion of said heating means with said electric circuit, circuit control means normally disconnecting the rest of said heating means from said circuit, a rotatable shaft, means on said shaft for operating the second circuit control means to connect the last mentioned portion of the heating means with the circuit so that the heat storing means may absorb the excess heat, and additional control means also mounted on said shaft for breaking the circuit to all portions of said heating means, the last mentioned control means including means for automatically returning the parts to their original relation.

5. An electric heating system comprising a heat storing medium having a heat radiating surface, means providing an electric circuit, two heaters associated with said circuit, a normally closed switch controlling the flow of current through said circuit, a second normally open switch controlling the flow of current to the second heater, magnets controlling said switches, and a control member for governing the operation of said switches, said control member having means for energizing the second switch to close the circuit to the second heater, and also having means for energizing the first magnet to break the circuit to both heaters, and having means for deenergizing said magnets so that the parts will assume their normal positions.

6. In an electric heating system, the combination with a heat storing medium and a heater associated therewith having two branches, a normally closed electro-magnetic switch for supplying current to both branches of said heater, a normally open electro-magnetic switch controlling the circuit to one branch of said heater so that the other branch is normally the only one in operation, automatic control devices for the respective electro-magnetic switches, and means for operating said control devices in predetermined sequence so as to first close the circuit to both branches, then break the circuit to both branches, and finally to restore the switches to their normal positions.

Signed at Albany, county of Albany and State of New York, this 8th day of March, 1922.

LEE P. HYNES.